(12) United States Patent
Cevolini

(10) Patent No.: US 7,312,269 B2
(45) Date of Patent: Dec. 25, 2007

(54) MIXTURE OF SINTERABLE POWDERS FOR RAPID PROTOTYPING

(75) Inventor: Franco Cevolini, Baggiovara (IT)

(73) Assignee: C.R.P. Technology S.r.L., Modena (IT)

( * ) Notice: Subject to any disclaimer, the term of this patent is extended or adjusted under 35 U.S.C. 154(b) by 616 days.

(21) Appl. No.: 10/815,713

(22) Filed: Apr. 2, 2004

(65) Prior Publication Data

US 2004/0209989 A1  Oct. 21, 2004

(30) Foreign Application Priority Data

Apr. 18, 2003  (IT) .......................... MO2003A0112

(51) Int. Cl.
*C08K 3/34* (2006.01)
(52) U.S. Cl. ...................... 524/492; 524/441; 524/493; 524/495; 524/496
(58) Field of Classification Search ................ 524/441, 524/492, 493, 495, 496
See application file for complete search history.

(56) References Cited

U.S. PATENT DOCUMENTS 5,733,497 A * 3/1998 McAlea et al. ............. 264/497
6,110,411 A * 8/2000 Clausen et al. ............. 264/497

FOREIGN PATENT DOCUMENTS

WO          98/41385      9/1998
WO          03/016030     2/2003

* cited by examiner

*Primary Examiner*—Edward J. Cain
(74) *Attorney, Agent, or Firm*—Hoffman, Wasson & Gitler, P.C.

(57) ABSTRACT

A mixture of sinterable powders for rapid prototyping, comprising a powdered polymer base and material of a substantially glassy type in the form of microflakes, optionally with the addition of a material of a substantially glassy type in the form of microspheres, powdered aluminum and/or powdered graphite.

29 Claims, No Drawings

MIXTURE OF SINTERABLE POWDERS FOR RAPID PROTOTYPING

The present invention relates to a mixture of sinterable powders for rapid prototyping RP, particularly for SLS (Selective Laser Sintering) processes.

BACKGROUND OF THE INVENTION

As it is known, rapid prototyping or RP is the name given to a host of related technologies that are used to fabricate physical objects directly from CAD data sources. It regards in particular a rather recently developed technique that allows to obtain automatically the prototype of a mechanical component starting from its CAD drawing in a short time and with relatively low costs regardless of the geometry of the component.

The resulting prototype can be used in place of the actual component in performing tests for example of the photoelastic type, so as to determine the mechanical characteristics of said component.

It is also known that there are various rapid prototyping technologies, which in any case entail superimposing a plurality of layers of material that are mutually rigidly associated so as to obtain a model, optionally a scale model, of the actual component.

These technologies differ in the manner in which the layers of material are applied during prototype construction; in particular, each technology is based on a different physical principle, which determines the nature and state of final aggregation of the materials used.

The rapid prototyping process is organized into various steps: initially, the component being studied must be drawn with the aid of a three-dimensional solid or surface modeling system, so as to obtain a three-dimensional CAD model, which is then converted into a format that can be read by the prototyping machine, which is generally an STL (from "stereolithography") format.

This conversion consists in approximating the surface of the model with a plurality of juxtaposed triangles, which are mutually adjacent so as to cover all of said surface.

The model in the STL format is sectioned, by the software that manages the rapid prototyping machine, with a plurality of parallel planes that are spaced by an appropriate thickness.

Each plane represents one of the layers of material that the machine subsequently superimposes; the contiguous layers bond with each other already during prototype construction.

Finally, it is possible to subject the resulting prototype to cleaning and finishing operations or to other kinds of treatment.

One of the known rapid prototyping technologies is constituted for example by the so-called SLS (Selective Laser Sintering) method, which is based on the consolidation of powders by means of a sintering process obtained by using a laser.

The machine used to perform this method is substantially constituted by a vertically movable platform on which the powder is deposited; said powder is retained inside the machine at a temperature just below its melting point, so as to constitute a layer of uniform thickness, which the laser strikes only at the region that forms the corresponding cross-section of the model to be produced, sintering it.

The platform then moves downward by an extent that corresponds to the thickness of the deposited material, and a new layer of powder is superimposed on the preceding one and sintered as described above, so as to solidify and bond with the underlying layer.

The process is repeated until the complete model is obtained.

The material currently used in rapid prototyping processes and in particular in the SLS method is generally constituted by a mixture of powders of the polyamide type, optionally with the addition of powders of various kinds that have a reinforcing effect.

Models obtained by using this material, while having a more than satisfactory quality, have still limited moduli of elasticity and low breaking loads.

During recent studies aimed at developing new sinterable materials that allow to optimize the mechanical characteristics of models produced by rapid prototyping, it has been found that the introduction of powdered aluminum in the above cited mixture increases the breaking load of the resulting models.

However, known sinterable powder mixtures are susceptible of further improvements, aimed in particular at improving the mechanical strength characteristics of the resulting models.

SUMMARY OF THE INVENTION

The aim of the present invention is to provide said improvements.

This aim and other objects that will become better apparent hereinafter are achieved by a mixture of sinterable powders for rapid prototyping according to the present invention, comprising a powdered polymer base, characterized in that it comprises material of a substantially glassy type in the form of microflakes.

The polymer base is preferably of the polyamide type and can comprise, for example, nylon.

Said glassy material is preferably constituted by amorphous silica, solidified as microflakes, also known as flakes, which can be thin (on the order of a few microns) and uniform and can have an irregular edge.

The dimensions of the microflakes are in any case compatible with the average particle size of the mixture.

The mixture can also comprise material of the substantially glassy type in microsphere form, powdered aluminum, and powdered graphite.

The glassy material in microsphere form is preferably constituted by amorphous silica.

Conveniently, the powdered graphite allows to improve the compactness of the layers of mixture that are deposited and solidified during the rapid prototyping process.

Moreover, the graphite allows to obtain a model that has a dark coloring.

The polymer base, the glassy material in microflake form, the glassy material in microsphere form, the powdered aluminum and the powdered graphite are present in the following quantities, which are independent from each other and are expressed as percentages of the total weight of the mixture:

polymer base, 20% to 90%; glassy material in microflake form, 0.1% to 70%; glassy material in microsphere form, 0% to 70%; powdered aluminum, 0% to 70%; powdered graphite, 0% to 40%.

According to conventional operating methods, the mixture according to the invention is prepared inside mixers in which the appropriate quantities of the various materials are introduced.

The resulting mixture is ready for use and can therefore feed conventional rapid prototyping machines, particularly machines for performing the SLS method.

Conveniently, said mixture can be applied in all the traditional sectors in which rapid prototyping is used, such as for example the manufacture of parts of vehicles, electrical household appliances, design items, or others.

Advantageously, it has been found by means of laboratory tests that models made with the mixture according to the invention have a greater mechanical strength than prototypes obtained with conventional materials, both at ambient temperature and at high temperatures.

Moreover, significant increases in elastic modulus and breaking load of the material have been observed.

The breaking load of the material obtained by sintering the mixture according to the present invention has been in fact found to be, for mixtures such as those given by way of example hereinafter, in the order of 51 MPa, while the breaking load of the materials conventionally used in rapid prototyping is in the order of 47 MPa.

The following mixture examples are given only by way of illustration of possible ways to provide the mixture of the present invention and must not be understood as limiting its scope as defined by the appended claims.

EXAMPLE 1

A first mixture of sinterable powders for rapid prototyping that was found to have enhanced breaking loads as set forth above was obtained from the following components:

| | |
|---|---|
| polymer base | 40% |
| glassy material in microflake form | 20% |
| glassy material in microsphere form | 20% |
| powdered aluminum | 20% |
| powdered graphite | 0% |

EXAMPLE 2

A second mixture of sinterable powders for rapid prototyping with enhanced breaking loads as set forth above was obtained from the following components:

| | |
|---|---|
| polymer base | 45% |
| glassy material in microflake form | 15% |
| glassy material in microsphere form | 20% |
| powdered aluminum | 15% |
| powdered graphite | 5% |

The persons skilled in the art would readily understand that other mixture compositions, based on sinterable powders suitable for rapid prototyping, that are in fact materials as defined in the appended claims may be formed in compositions that are thereby comprised within the scope of the claims.

The disclosures in Italian Patent Application No. MO2003A000112 from which this application claims priority are incorporated herein by reference.

What is claimed is:

1. A composition of sinterable powders for rapid prototyping, comprising a powdered polymer base and a substantially glassy material, wherein the composition further comprises powdered aluminum or powdered graphite or both; and wherein the glassy material is present in the composition in microflake form or microsphere form or both.

2. The composition of claim 1, wherein said polymer base comprises a polyamide.

3. The composition of claim 2, wherein said polyamide polymer base comprises nylon.

4. The composition of claim 1, wherein said glassy material comprises amorphous silica.

5. The composition of claim 1, wherein said glassy material is in the form of microspheres.

6. The composition of claim 5, wherein said glassy material comprises amorphous silica.

7. The composition of claim 5, comprising powdered aluminum.

8. The composition of claim 5, comprising powdered graphite.

9. The composition of claim 1, wherein said polymer base is present in an amount between about 20% and 90% by weight.

10. The composition of claim 9, wherein said polymer base is present in an amount between about 35% and 50% by weight.

11. The composition of claim 10, wherein said glassy material is in microflake form and is present in an amount between about 0.1% and 70% by weight.

12. The composition of claim 11, wherein said glassy material is in microflake form and is present in an amount between about 10% and 25% by weight.

13. The composition of claim 10, wherein said glassy material is in microsphere form and is present in an amount up to about 70% by weight.

14. The composition of claim 13, wherein said glassy material in microsphere form is present in an amount between about 15% and 25% by weight.

15. The composition of claim 7, wherein said powdered aluminum is present in an amount up to about 70% by weight.

16. The composition of claim 15, wherein said powdered aluminum is present in an amount between about 10% and 25% by weight.

17. The composition claim 8, wherein said powdered graphite is present in an amount up to about 40% by weight.

18. The composition of claim 17, wherein said powdered graphite is present in an amount up to about 10% by weight.

19. The composition of claim 1, comprising a polymer base, glassy material in microflake form, glassy material in microsphere form, and powdered aluminum, in the following amounts:

| | |
|---|---|
| polymer base | 40% |
| glassy material in microflake form | 20% |
| glassy material in microsphere form | 20% |
| powdered aluminum | 20%. |

20. The composition of claim 1, comprising a polymer base, glassy material in microflake form, glassy material in microsphere form, powdered aluminum and powdered graphite, in the following amounts:

| | |
|---|---|
| polymer base | 45% |
| glassy material in microflake form | 15% |

-continued

| | |
|---|---|
| glassy material in microsphere form | 20% |
| powdered aluminum | 15% |
| powdered graphite | 5%. |

21. The composition of claim 1, comprising powdered aluminum.

22. The composition of claim 1, comprising powdered graphite.

23. The composition of claim 1, comprising both powdered aluminum and powdered graphite.

24. The composition of claim 1, wherein the glassy material is in the form of microflakes or in the form of microflakes and microspheres.

25. The composition of claim 24, wherein the glassy material comprises amorphous silica.

26. The composition of claim 24, comprising powdered aluminum.

27. The composition of claim 24, comprising powdered graphite.

28. The composition of claim 24, comprising both powdered aluminum and powdered graphite.

29. The composition of claim 7, comprising both powdered aluminum and powdered graphite.

* * * * *